H. SCHMIDT.
Bolt and Rod Cutters.
No. 142,354.           Patented September 2, 1873.
FIG. I
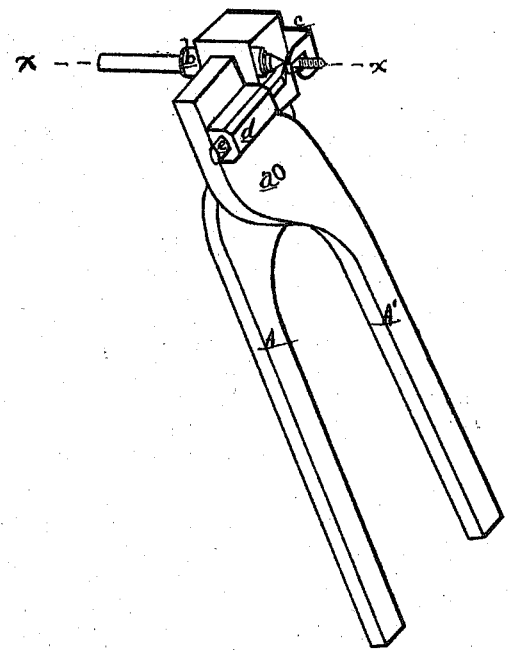
FIG. II.
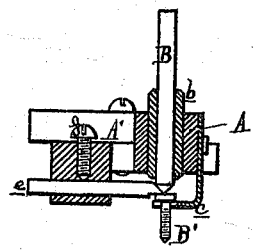
ATTEST           INVENTOR.

UNITED STATES PATENT OFFICE.

HUGO SCHMIDT, OF CHICAGO, ILLINOIS.

IMPROVEMENT IN BOLT AND ROD CUTTERS.

Specification forming part of Letters Patent No. 142,354, dated September 2, 1873; application filed May 21, 1873.

*To all whom it may concern:*

Be it known that I, HUGO SCHMIDT, of Chicago, in the county of Cook and State of Illinois, have invented a new and useful Improvement in a Cutting-Off Tool; and I do declare that the following is a true and accurate description thereof, reference being had to the accompanying drawings and to the letters of reference marked thereon, and being a part of this specification, in which—

Figure 1 is a perspective view of my device as it appears when cutting off a screw formed on the end of a wire-rod. Fig. 2 is a cross-section of the same at $x\ x$ in Fig. 1.

Like letters refer to like parts in both figures.

The nature of this invention relates to an improved tool for cutting off screws or similar objects from the ends of rotating rods, and to give the heads a uniform shape and depth, both of which may be varied, however, by changing or adjusting the cutting-tool and gage; and it consists in a pair of crossed levers, preferably in the shape of a pair of tongs, one of which carries at the side of its jaw a lateral adjustable clamp, also a guide-tube to receive the end of the rod to be cut off, while the other lever carries a cutting-off tool, operating as more fully hereinafter set forth.

In the drawing, A A' represent two crossed levers, pivoted together, at $a$, like a pinchers or pair of tongs. The former has a guide-tube, $b$, horizontally inserted through its outer end, and underneath the end a gage-stop, $c$, is adjustably secured thereto. The gage-stop is bent upward at a right angle to extend across the axis of the tube $b$, and slotted in that plane, as shown in Fig. 1. To the other lever a tool-holder, $d$, is attached by casting it in one piece with the side of its jaw, and through it is inserted a cutting-off tool, $e$, secured therein by a set-screw, $f$, laterally tapped through the side of the jaw, as seen in Fig. 2. B is a rod, on the end of which a machine-screw, B', has been formed, which is being cut off by the tool $e$, as plainly represented in Fig. 2.

In the manufacture of small screws a wire or rod is so chucked in the hollow spindle of a lathe as to leave an end projecting for a certain distance. By means of a hollow cutter the end of the rod is reduced in diameter and a shoulder left on the rod. The thread is then cut, when with my device the screw is cut off by sliding the guide-tube upon the rod until the shoulder (which forms the under side of the head) is arrested by the slot in the guide-stop, whereupon the levers are closed together, when the tool cuts off the rod, leaving the head of the screw finished ready for slotting, and the rod pointed for the next screw.

This tool is applicable to all purposes where rods are to be cut off to gage other than in the manufacture of screws; the levers may be substituted by equivalent devices of other forms.

What I claim as my invention, and desire to secure by Letters Patent, is—

The levers A A', carrying respectively the tube $b$ and gage-stop $c$ and the cutting-off tool $e$, constructed, arranged, and operating substantially as and for the purpose set forth.

HUGO SCHMIDT.

Witnesses:
WM. H. LOTZ,
EMIL RIEGERT.